Figures 1, 3:
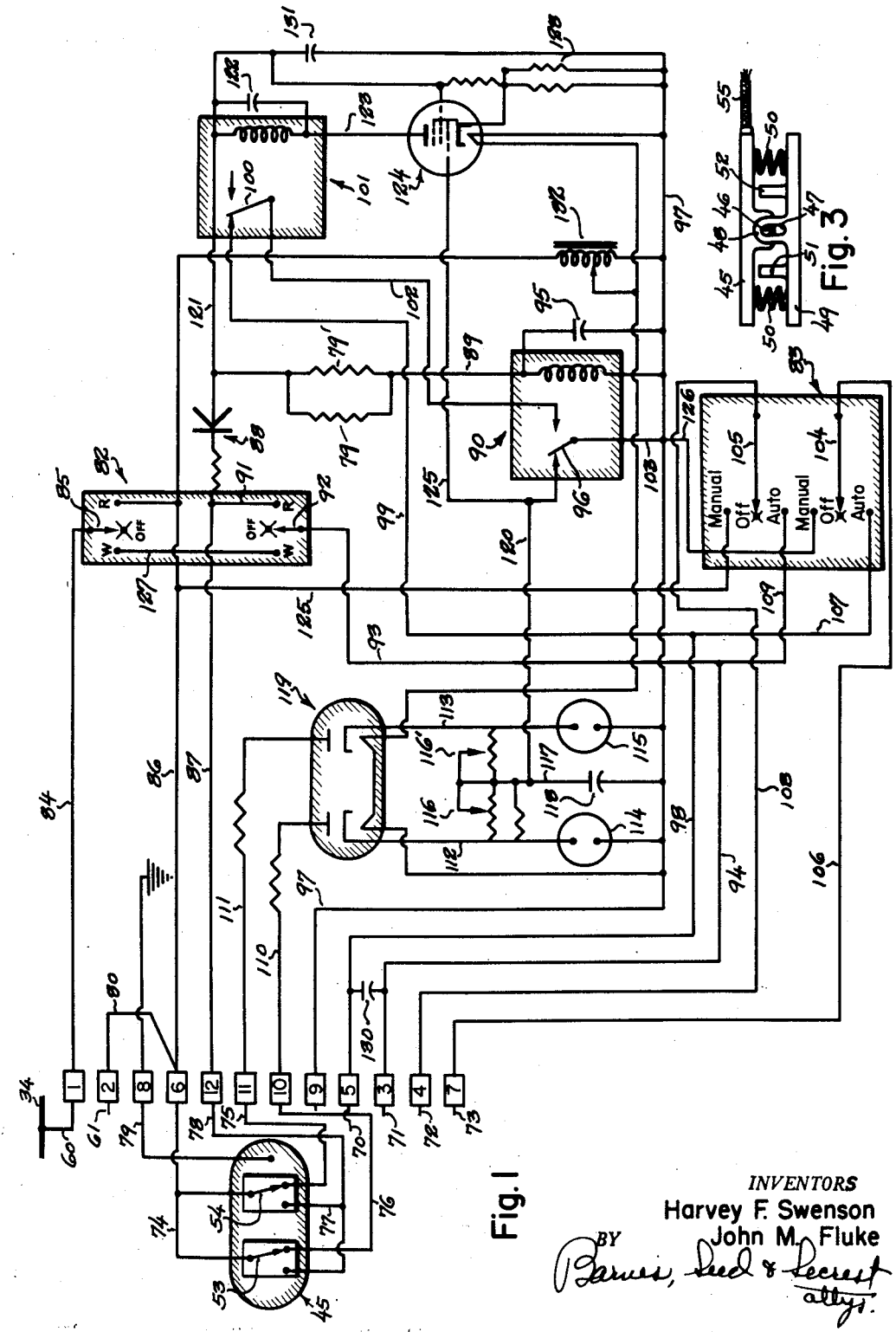

Dec. 24, 1957   H. F. SWENSON ET AL   2,817,214
PORTION CONTROL FOR DISPENSING FREEZER
Filed March 7, 1955   2 Sheets-Sheet 1

INVENTORS
Harvey F. Swenson
John M. Fluke
BY

Dec. 24, 1957 H. F. SWENSON ET AL 2,817,214
PORTION CONTROL FOR DISPENSING FREEZER
Filed March 7, 1955 2 Sheets-Sheet 2

INVENTORS
Harvey F. Swenson
John M. Fluke
BY

United States Patent Office 2,817,214
Patented Dec. 24, 1957

2,817,214

PORTION CONTROL FOR DISPENSING FREEZER

Harvey F. Swenson and John M. Fluke, Seattle, Wash.

Application March 7, 1955, Serial No. 492,693

21 Claims. (Cl. 62—4)

This invention relates to a portion control for a dispensing freezer of that general type which acts to freeze a custard or other like mix within a freezing cylinder, and dispense the same from said cylinder in individual servings, and in which replenishing mix is charged to the cylinder automatically as each of a succession of servings are dispensed. In freezers of this type there is employed within the cylinder a dasher, such dasher being journaled for rotation and providing a spirally developed blade which performs two functions, firstly that of blending the mix within the cylinder and secondly that of pushing the mix forwardly within the cylinder so that, upon opening the front gate through which the frozen mix is dispensed, there is developed upon the mix a following pressure causing the mix to be extruded through the open gate. Given a constant rotary speed, the pressure created by the dasher is perforce constant while the dasher is turning. Thus it would appear that a holding of the gate open for identical periods of time on each of a succession of serving operations would result in identical-sized servings. This, however, is not true if the dasher is already turning at the moment of initiating the time period in one instance and is stationary at the moment of initiating the time period in another instance. A time interval is perforce required in order to bring the dasher to normal turning speed from a condition at rest, and during this interval a lesser quantity of frozen mix is dispensed through the open gate than would have been the case had the dasher been turning when the gate was opened. It is of course one function of the dasher to condition the mix, being caused to turn automatically in concert with the operation of the compressor whenever the temperature of the mix falls below a given point, wherefor the dasher is stationary at times and is turning at other times. It is a principal object of the present invention, therefor, to devise a means including a time delay by which the activation of a selector for effectuating a serving of frozen cream opens the front gate only after the dasher has reached normal operating speed. There is a further advantage which follows from the provision of a momentary time delay between the activation of the dasher and an opening of the serving gate, and that is protection against spillage. It gives the operator a momentary interval of time within which to place a receiving receptacle under the serving gate or, should the closing of the initiating switch have been an accidental act, to open such switch.

The invention has the further object of devising a control means for the accomplishment of the above end which incorporates electronic devices.

As further particular objects the invention aims to provide a portion control the accuracy of which is unaffected either by changes in atmospheric temperature or by variations in the line voltage to the control.

As a further object still, the invention purposes to provide a portion control taking its activating impulses from a foot switch, one wherein this foot switch admits of being either bodily depressed or of having either end depressed individually at will, and one which, by said bodily depression, produces continuous serving and, by depression of only an end of the switch, initiates a timed serving operation giving a large or a small serving according as to which end is depressed.

Another object of the invention is to provide an electronic control means characterized in that tube failure does not disable the dispensing machine with which the control means is associated, the machine, although losing the important feature of an automatically controlled serving time, being still caused to function by depression of the foot switch and, for inactivation, requiring only that the circuit through such foot switch be interrupted manually.

The invention has the still further and important object of providing a control system in which the dispenser who is making servings to customers need operate nothing beyond the foot-switch, all manual settings subject to adjustment as well as the control of all cleaning steps being handled by the store manager or supervisor so that these operations are taken out of the hands of unskilled personnel.

With these and other still more particular objects and advantages in view and which will appear and be understood in the course of the following description and claims, the invention consists in the novel construction and in the adaptation and combination of parts hereinafter described and claimed.

Figure 2:
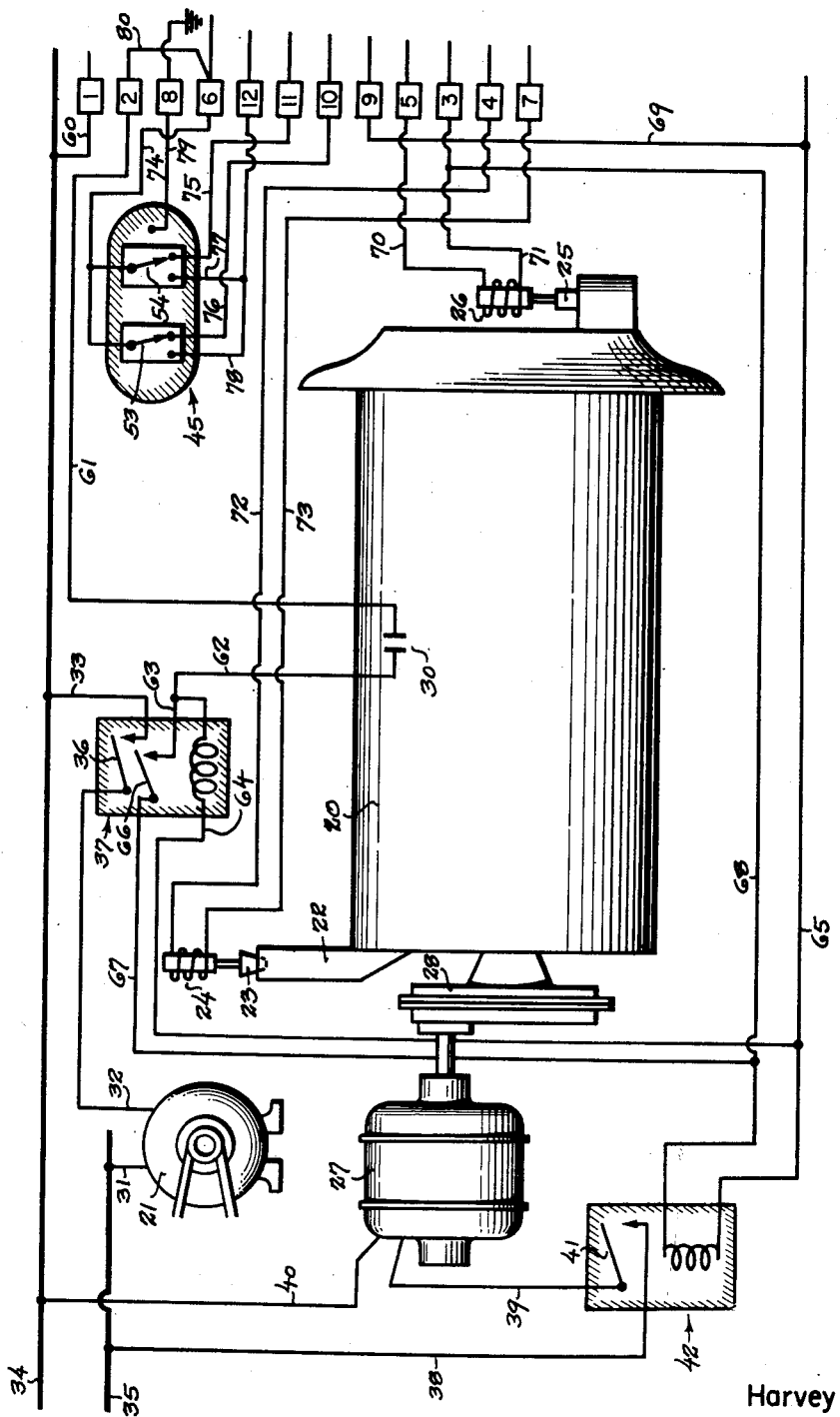

In the accompanying drawings:

Figures 1 and 2, taken together, are a diagrammatic view portraying, in its operating association with a commercial freezer, control structure embodying teachings of the present invention; and Fig. 3 is a fragmentary somewhat schematic side elevational view illustrating the foot switch of the present invention.

The freezing cylinder of the present invention is denoted by the numeral 20, employing the usual refrigeration circuit in which there is contained a motor-driven compressor and a condenser, such motor being designated by 21. Cream, fluid custards and the like which are to be frozen, and which will be hereinafter termed the mix, is supplied to the freezing chamber of the cylinder through a valved pipe 22, and the valve 23 for such pipe is here shown as being of the self-closing type opened by activation of a solenoid 24. The frozen contents of the freezing chamber are dispensed in individual servings, as successive calls therefor arise, through a valved discharge opening, and the valve 25 which functions as a gate to open and close this discharge opening is or may be of the gravity-closing plunger type mounted for endwise vertical movement and caused to be opened by activation of a solenoid 26. Within the freezing chamber there is provided a rotary dasher having the usual spirally developed blades, and this dasher, which serves the double-duty function of blending the mix contained in the freezing chamber and also urging the mix forwardly toward the discharge opening, is driven by a motor 27 passing its drive into the cylinder by reduction gears contained in a gear box 28.

30 designates a thermostatic switch responding to the temperature of the mix within the freezing chamber, its function being to close and open circuits including the two motors so that the mix will be automatically maintained at a consistency considered ideal for serving. Such circuit for the compressor motor 21 is a 220 v. circuit drawing current by lead lines 31, 32 and 33 from hot wires 34 and 35, and including the normally open switch 36 of a relay 37. A similar 220 v. circuit for the dasher motor 27 draws current by lead lines 38, 39 and 40, and includes the normally open switch 41 of a relay 42.

An important feature of the present invention is its provision of a serving control by which the operator is enabled at will to hold the discharge valve open for either a given long or a short period, comparatively speaking, so as to serve a uniformly measured large or small portion of the frozen product, or for special orders, such as the filling of a bulk container, to maintain said valve in an open condition for any time interval which the operator may desire. This serving control (see Fig. 3) is formed as a foot switch, thereby leaving the hands of the operator completely free and is characterized in that there is provided a pedal 45 fulcrumed intermediate its ends by trunnion pins 46, and having these pins received in vertical slots 47 presented by cheek elements 48 of a mounting base 49. Foot-activated depression of either side of the pedal about the center of said pins 46 as a fulcrum, or of the entire pedal bodily along the vertical guide path prescribed by the slots 47, is yieldingly opposed by springs 50. Posts 51 and 52, one for each of the two ends of the foot pedal, are disposed in an interruptive position below said pedal, and carried by the pedal for engagement with said posts are respective single-pole double-throw toggle switches 53 and 54 (see Figs. 1 and 2). In the normal elevated position of the foot switch each of these 2-position toggle switches occupies one such position. Depressive pressure applied to either end of the switch, selectively, moves the related switch into its other position, or both of said switches can be moved simultaneously to said latter positions by stepping upon the center of the pedal so as to press the trunnion pins 46 downwardly in the slots. Electric connections to said toggle switches are brought to the hollow interior of the pedal by a cable 55.

Proceeding now to detail a preferred circuit by which we control the functioning of the described freezer, it is seen that we provide a 12-pole main plug portrayed in the drawings by the showing of twelve in-line squares in each of which there appears a distinguishing number. In the order of their occurrence these numbers are 1, 2, 8, 6, 12, 11, 10, 9, 5, 3, 4 and 7. The leads which run from the twelve female complements in which these twelve male poles are socketed connect with the freezer's electric devices which have been hereinabove referred to. Tracing these leads (see Fig. 2), line 60 runs to female terminal #1 from hot line 34. Female terminal #2 connects by lead line 61 with the temperature control switch and thence, by lead line 62 both with the coil of the relay 37 and, by a branch lead 63, with one terminal of a normally open switch 66 closed by an energizing of said coil. The circuit through the coil is completed by a lead line 64 connecting with a neutral line 65. The other terminal of said relay switch 66 connects by lead lines 67 and 68 with the coil of the relay 42.

From the female terminal #8 of the socket-piece for said 12-pole plug a grounding line 79 is attached to the pedal 45 of the foot-switch. Female terminal #6 is tailed by line 80 to the terminal 2, and additionally runs by lead 74 to anchor terminals of each of the two blades 53 and 54 of the foot switch. The poles of the foot switch which are in normal contact with the switch blades 53 and 54 connect by leads 76 and 75, respectively, one with the female terminal #10 and the other with the female terminal #11. The poles of the foot switch which are normally out of contact with said switch blades each connect by joined leads 78 and 77 with the female terminal #12.

From female terminal #5 lead 70 runs to the solenoid 26 for the discharge valve 25, this solenoid being hereinafter termed the dispensing solenoid, and lead 71 returns to the female terminal #3. Similarly, leads 72 and 73 to and from the mix-feed solenoid 24 connect with female terminals #4 and #7, respectively. Lead line 68 is joined to said lead 71. The remaining female terminal #9 connects by a lead 69 with the neutral 65, and it will be noted that this neutral, in addition to its connection, by lead 64, with one side of the coil for the relay 37, also connects with one side of the coil for the relay 42.

Now with reference to the twelve male pins of the 12-pole plug, there are two manually operated switches associated therewith. Denoted by 82 and 83, respectively, we will term these switches the main control switch and the mix-feed switch. The main switch 82 is a double pole, 3-position switch, having the three positions labelled "Wash," "Off" and "Run." The switch 83 is likewise a double-pole, 3-position switch, with the positions labelled "Manual," "Off" and "Automatic."

From pin #1 of the 12-pole plug, a lead 84 carries 50 or 60 cycle power to the anchor contact of one blade 85 of the main switch. Assuming this switch to be in the "Run" position, lead 86 impresses power on pin #6 of the 12-pole plug. This is the main power lead to the two blades of the foot switch 45. Closing either pole of this double-pole foot switch carries current through lead 78 to pin #12 and thence by lead 87 to a selenium rectifier 88. From the rectifier, lead 89 brings D. C. power to the coil of a relay 90.

Lead 91, joined to said lead 87, carries current from pin #12 to the "Run" position of the second blade 92 of the main control switch, and from the anchor contact of this switch blade two joined leads 93 and 94 connect with the pin #3 which connects by its female complement both with one side of the dispensing solenoid 26 and one side of the coil for the relay which starts the dasher motor. The other side of such latter coil is connected with neutral, hence causes the motor to start up. Pin #5, which has connection with the other side of the dispensing solenoid 26, is momentarily isolated from neutral by the operation of the relay 90. Relay 90 has a 100 mfd. timing capacitor 95 across its coil and this combination is in series with two resistors 79 and 79' so that, on operation of the foot switch, the switch blade 96 of the relay is not drawn into its magnetically attracted position for a period of 0.7 second. This momentarily maintains in open condition a circuit from pin #5 to neutral wire 97 which includes joined leads 98 and 99, the normally open blade 100 of a relay 101, lead line 102, and lead line 103. To reiterate, from the foregoing it will be seen that a closing of either pole of the foot switch instantly starts the dasher motor but introduces a time delay in the energization of the dispensing solenoid. When the mix feed switch 83 is placed in its normal operating position, and namely with the two blades 104 and 105 on "Auto," the solenoid 24 for the mix feed valve 23 operates with the same time delay as the dispensing solenoid 26. This follows from the fact that lead 106 runs from pin #7 to the anchor contact of one blade 104. Lead 107 connects the related "Auto" position with lead 99 of the circuit interrupted by blade 96 of relay 90. Current for this mix feed solenoid is drawn by a line 109 which connects lead line 93 with the "Auto" position of the other switch blade 105, thence runs by lead line 108 to pin #4.

Since the foot switch 45 is comprised of two single-pole, double-throw blades 53 and 54, in the normal elevated condition of the foot switch power is supplied at all times through pins #10 and #11, from which leads 110 and 111 run, respectively, to the two plate-contacting pins of a diode tube 119. This is a double diode tube, a 6AL5 for example, and D. C. current is thus normally supplied at all times through its two circuits and by leads 112 and 113 to two NE2, 65 v. neon tubes 114 and 115, which neon tubes are connected in parallel to neutral 97. The hot sides of the two neon tubes are shunted together by two 10,000,000 ohm adjustable carbon potentiometers 116 and 116', and from the mid-point connection of the potentiometers one lead line 117 goes to a ½ mfd. timing capacitor 118 and a second lead line goes to relay switch 96 so that, in the normal condition of the relay 90, and which is to say with the coil deenergized, the capacitor 118 is shorted to neutral 97.

From the D. C. side of the selenium rectifier 88, a lead 121 connects with the coil of the relay 101. A 1 mfd. filter capacitor 122 is connected across this coil. From the other side of the coil a lead 123 runs to the plate of a grid-control tube 124, a 6AQ5 tube for example. Relay 101 will consequently operate only when tube 124 is conducting, and such tube has a grid which precludes the same from conducting until the voltage on the grid rises to a given potential. Such grid is connected by lead 125 and lead 120 to the timing capacitor 118 of said double diode tube 119. An interruption of the power running through leads 110 and 111 to either of the plate pins of tube 119, with consequent interruption of current through the related D. C. circuit, stops the flow of current through the concerned potentiometer. This current normally is shorted to neutral, but an activation of the foot switch also energizes the coil of relay 90 and this breaks the shorting circuit through lead 120, switch blade 96, and lead 103. This allows the voltage of the timing capacitor 118 to be built up gradually through the adjustable potentiometer and supplied by the particular circuit of the tube 119 which is still allowed to conduct. This voltage is impressed on the grid of the tube 124, which eventually conducts and responsively allows current to flow through the coil of relay 101 and its filter capacitor 122.

From the foregoing it will thus be seen that the energizing of relay 90, after the 0.7 second delay, acts to close pin #5 to neutral, establishing a circuit which includes line 98, line 99, switch blade 100 of relay 101, line 102, switch blade 96 of relay 90, and line 103. This circuit is then again broken after a time delay by the energizing of relay 101, drawing switch blade 100 into its open condition. By the setting of the adjustable potentiometers, which govern this latter time delay in that they vary the time constant formed by the potentiometer and the timing capacitor 118 which in turn is felt on the grid of tube 124, two different predetermined time delays may be established as between the moment the relay 90 is energized and the moment the relay 101 is energized. The selection of one or the other of these predetermined time delays is perforce made by choosing one or the other side of the foot switch 45. Operation of the foot switch supplies power continuously to the relay 90 and to the coil of the relay 42 which energizes the motor 27 for the dasher, but on release of the foot switch the coils of both relays are de-energized. This de-energizing allows the contacts to return to normal and the timing capacitor 118 then again becomes shorted to neutral through the switch blade 96. Tube 124 stops conducting, when foot switch 45 is released because D. C. to the rectifier 88 is removed, and the circuit is reset in condition for the next operation of the foot switch.

The function performed by the two neon tubes 114 and 115 is to stabilize the voltage for the main timing capacitor and resistors 116 or 116' since the voltage across the neon tubes is relatively constant. Consequently, the timing circuit voltage is held essentially constant for each operation of the foot-switch even though the line voltage to the control may vary over a wide range.

A thermistor current regulating device 128 parallels the resistor feeding the cathode of the tube 124. Such thermistor has the characteristic of reducing its resistance upon an increase in temperature. As the temperature within the control enclosure increases, the cathode potential of tube 124 is lowered. This, in turn, allows the grid of tube 124 to cause tube 124 to pass current somewhat earlier in the timing cycle and hence to compensate for the somewhat increased voltage pull in requirements of the solenoid of relay 101 as its resistance increases due to the temperature rise.

Continuous operation, without any timing action, of the solenoids 23 and 26 which open the mix feed and dispensing valves occurs when both blades 53 and 54 of the foot switch are operated simultaneously, and which is to say by stepping upon the center of the foot pedal so that the trunnion pins 46 are pressed downwardly in the slot 47 and both posts 51 and 52 are brought into operating engagement with their related switch blades. This operation of both blades 53 and 54 isolates the tube 119 from the power source and capacitor 118 is thus not charged, tube 124 thus never conducts, the relay 101 is held de-energized with the result that switch blade 100 remains in its normal circuit-closing position.

For a hand-controlled operation of the mix feed solenoid, switch blades 104 and 105 are moved into "Manual" position. Current is then taken directly off the "Run" position of the main control switch 82 by means of a lead 125. Power passed to pin #4 through lead 108 returns by lead 106 from pin #7 to the switch blade 104, thence running by lead 126 directly to neutral 97.

It is here expressly pointed out that either or both tubes can fail without disabling the dispensing freezer. While the controlled time of serving is lost the machine will still function to dispense successive servings, requiring only that the operator hold the foot switch depressed for the time interval of dispensing which is desired.

It will have been understood that power is continuously supplied from lead 86 through tail lead 80 and connecting lead 61 to the temperature control 30. As this thermostatic switch closes and opens it makes and breaks circuits through the coils of relay 37 and relay 42, causing activation and inactivation of the motors 21 and 27.

A positioning of the main control switch 82 at "Wash" supplies power only to the coil of the relay 42, current then passing by switch blade 85, lead 127, and switch blade 92 to lead line 93, thence through connecting lead 94 to pin #3 which is connected by lead 68 with said coil.

There is included in our illustrated circuit a surge condenser 130 to protect the relay contact points when the dispensing solenoid 26 is de-energized, and a capacitor 131 for smoothing out voltage wave on the rectifier 88. A transformer for the heater circuit of the tube 124 is denoted at 132.

It is important to note that the primary time cycle, and namely the 0.7 second time delay cycle, can be by-passed after a serving has been made simply by again instantly pressing down upon the foot switch. Such action will initiate the secondary time cycle, and namely the portion-determining time cycle, without the preliminary 0.7 second delay. This is beneficial for making double servings in that the operator does not lose the time which the primary cycle requires, and such primary time cycle is then unnecessary in that the dasher does not come to rest in such a short interval between servings.

The most salient advantages of the invention will no doubt have been readily seen from the foregoing, but some important accomplishments may not be instantly apparent and should, perhaps, be pointed out. The use of a foot switch giving a choice of pre-set portion sizes leaves the hands free to handle the containers into which the selected portions are to be dispensed. Distinguished from existing arrangements employing a hand-set timer as a portion selector, and used in conjunction with a foot switch serving only to close a circuit through the timer, the present invention is also a safeguard against the possibility of one operator leaving the timer set, say, for a small-portion serving, and the next operator, not noticing this setting, dispensing such small portion while actually intending to dispense a large-portion serving. Furthermore, the foot-switch of the present invention can be released at any time and the timing cycle will be then broken. This gives the operator a control in cases of over-filling a dish or other receiving receptacle. The incorporation of a separate switch 83, used in conjunction with the master switch 82, for controlling the mix feed is especially advantageous. When this switch is in "Manual" position it feeds mix when the dasher motor circuit is energized, without opening the dispensing gate, When the switch 83 is in "Auto" position, the mix feed and the dispensing gate work in concert. The use of an electrical switch to control the mix feed eliminates any need for a handling of the feed valve parts and consequents danger of contamination. Should it be found that the mix valve is feeding too much mix during a run period of the machine the switch 83 can be moved to "Off" for a short interval, thus providing means of rebalancing the level of the mix in the freezing cylinder.

It is thought that the invention will have been clearly understood from the foregoing detailed description. The control circuit illustrated indicates a preferred arrangement by which to accomplish our objective ends but other means of control are within the inventive concept and can self-evidently be resorted to. It is furthermore expressly pointed out that inventive rights are reserved in and to the novel aspects of the circuit separate and apart from the particular application with a bulk-commodity dispensing machine in which it is here shown.

What we claim is:

1. In a machine for dispensing a bulk commodity, a normally inactive means operating when activated to dispense the commodity at a substantially constant rate, at least two normally inactive and selectively operated timing devices having timing cycles of differing duration, means operatively interconnecting both of said timing devices with the dispensing means operating upon an activation of either of said timing devices to cause the dispensing means to be operated in concert therewith, and a foot-operated means acting both to make a selection as between the timing devices and to cause the selected timing device to be activated simultaneously with the selection.

2. The machine of claim 1 in which the foot-operated means admits of being so operated as to by-pass the timing devices at will and cause the dispensing means to be operated continuously.

3. In a machine for dispensing a bulk commodity, a normally inactive means operating when activated to dispense the commodity at a substantially constant rate, at least two normally inactive and selectively operated timing devices having timing cycles of differing duration, means operatively interconnecting both of said timing devices with the dispensing means operating upon an activation of either of said timing devices to cause the dispensing means to be operated in concert therewith, and a plurality of selectively operated means each activated by pressure of an operator's foot and functioning in the instance of one said means to select and activate one of the timing devices, in the instance of a second said means to select and activate the other of said timing devices, and in the instance of a third said means to operate the dispensing means without recourse to the timing devices.

4. In a machine for dispensing a bulk commodity, a container for the commodity, a normally inactive means operating when activated to dispense the commodity from the container at a substantially constant rate, a normally inactive means operating when activated to replenish the container with the commodity at a substantially constant rate, at least two normally inactive and selectively operated timing devices having timing cycles of differing duration, means operatively interconnecting both of said timing devices with the dispensing means operating upon an activation of either of said timing devices to cause said dispensing means and said replenishing means to be both operated in concert therewith, and means operable by momentary pressure acting both to make a selection as between the timing devices and to cause the selected timing device to be activated simultaneously with the selection.

5. In a machine for dispensing a bulk commodity under force of pressure, a container for the commodity having a normally closed gate through which the commodity is dispensed, normally inactive means for establishing pressure upon the commodity within the container, means for activating said pressure-establishing means, means for opening the gate operable only when said pressure has been established on the commodity, and means for closing the gate upon the expiration of a given time interval.

6. In a machine for dispensing a bulk commodity under force of pressure, a container for the commodity having a normally closed gate through which the commodity is dispensed, and means for first establishing pressure upon the commodity within the container, then opening said gate after a time delay of predetermined duration, and finally closing said gate after a further time delay of predetermined duration.

7. In a machine for dispensing a bulk commodity under force of pressure, a container for the commodity having normally closed gates through one of which the commodity is dispensed and through the other of which replenishing amounts of the commodity are supplied to the container, and means operable through a time cycle of predetermined duration for first establishing pressure upon the commodity within the container and then, after a time delay, opening both of said gates.

8. In a machine for dispensing a bulk commodity under force of pressure, a container for the commodity having a normally closed gate through which the commodity is dispensed, and means operable through a time cycle of predetermined duration for first establishing pressure upon the commodity within the container and then, after a time delay, opening said gate.

9. In a machine for dispensing a bulk commodity, a container for the commodity having a normally closed gate through which the commodity is dispensed, a spirally developed blade journaled for rotation within the container and operating by its turning movement to push the commodity toward the gate, and means operable through a time cycle of predetermined duration for first imparting rotation to the blade and then, after a momentary time delay, opening the gate while continuing to impart rotation to the blade.

10. In a commercial ice cream freezer, a freezing cylinder adapted to freeze mix supplied thereto and having a normally closed discharge gate, a rotary dasher within the freezer operable by its turning motion to push the frozen mix toward said gate, means for automatically starting and stopping the dasher as the temperature of the mix within said cylinder falls below and rises above a given range, and a dispensing control operable through a given time cycle acting to first impart rotation to the dasher and then, after a momentary time delay, opening the gate while continuing to impart rotation to the dasher.

11. In a commercial ice cream freezer, a freezing cylinder adapted to freeze mix supplied thereto and having a normally closed valved discharge, an electrically operated device for opening the valve of said discharge, a normally open electric circuit therefor, a rotary dasher within the freezer operable by its turning motion to push the frozen mix toward said discharge, an electric motor for driving said dasher, an electric circuit controlling the operation of said motor and including a thermostatic switch acting to close and open the concerned circuit automatically as the temperature of the mix within said cylinder falls below and rises above a given range, a second normally open electric circuit which likewise acts when closed to energize the motor, and a normally inactive dispensing control operable when activated to first close said second circuit so as to energize the motor and then, after a momentary time delay, close the circuit for said electrically operated device.

12. In a commercial ice cream freezer, a freezing cylinder adapted to freeze mix supplied thereto and having a normally closed valved discharge and a normally closed valved inlet, respective electrically operated devices for opening the valves of said discharge and inlet openings, a rotary dasher within the cylinder operable by its turning motion to push the frozen mix toward said discharge, an electric motor for driving said dasher, a manually operated switch acting when closed to complete a normally open electric circuit to the motor, a thermostatic switch acting automatically to open and close a normally open electric circuit to the motor as the temperature of the mix within said cylinder falls below and rises above a given range, and a normally inactive control operable automatically by a closing of said manual switch but only after the expiration of a momentary time delay to first close normally open electric circuits to said electrically operated devices and then, after a period of predetermined duration, open said circuits to the electrically operated devices.

13. The freezer of claim 12 in which said manually operated switch is a 3-position switch in two of which positions the switch is closed, and wherein the predetermined period of time during which said electrically operated devices are responsively energized when said manually operated switch is in one of its two closed positions is of shorter duration than when the switch is in the other closed position.

14. A freezer according to claim 13 in which the manually operated switch is a foot switch comprising a pedal member pivoted for rocker movement about a center fulcrum with the two ends each spring-urged upwardly and having the fulcrum received in a vertical slot so that either end of the pedal can be depressed selectively or the entire pedal depressed bodily, and including a respective spring-loaded type 2-position switch blade associated with each of the two ends of said pedal, said switch blades being each disposed in one of their respective two positions when the pedal occupies its elevated position, means being provided operative upon the switch blades causing each blade to move to the other of its two positions in response to a foot-operated depression of the related end of the pedal.

15. In a commercial ice cream freezer, a freezing cylinder adapted to freeze mix supplied thereto and having inlet and outlet openings normally closed by gates and through the former of which mix is supplied to the cylinder and through the latter of which the frozen mix is dispensed, respective electrically operated devices for opening said gates, a rotary dasher within the cylinder operable by its turning motion to push the frozen mix toward said discharge, an electric motor for driving said dasher, at least two 2-position switches manually operable individually selectively and acting when closed to complete a normally open electric circuit to the motor, a thermostatic switch acting automatically to open and close a normally open electric circuit to the motor as the temperature of the mix within said cylinder falls below and rises above a given range, and a normally inactive control operable automatically by a closing of either of said manual switches but only after the expiration of a momentary time delay to first close normally open electric circuits to said electrically operated devices and then, after respective periods of predetermined differing durations, open said circuits to the electrically operated devices.

16. A freezer according to claim 15 in which said control is electrical, and having electrical means in association with said electrical control operating to hold said predetermined duration periods in which the said electric circuits are open substantially constant even though line voltage to the control may vary over a wide range.

17. A freezer according to claim 15 in which the circuits to said electrical devices each include the open switch blade of a relay which is included in said normally inactive control and wherein the momentary time delay is obtained by means of a timing circuit arranged to delay the energizing of the relay.

18. A freezer according to claim 15 in which the circuits to said electrical devices each include in series the normally open switch blade of a first acting relay and the normally closed switch blade of a second acting relay, and having separate normally incomplete electric circuits for the coils of said relays which include electrical means for energizing the coil of the first acting relay only after said momentary time delay and for energizing the coil of the second acting relay only after the expiration of a further period of time.

19. The freezer described in claim 17 in which the electrical means for energizing the coil of the second acting relay includes an electronic timing device.

20. A freezer according to claim 15 in which the circuits to said electrical devices each include in series the normally open switch blade of a first acting relay and the normally closed switch blade of a second acting relay, having for the coil of the first acting relay a normally incomplete electric circuit including a resistor in series with a parallel combination of a capacitor and relay coil to comprise a time delay action, and having for the coil of the second acting relay a normally open electric circuit closed by the conduction of an electron tube which is made to conduct only when the voltage on the grid rises to or above a given potential, an activator means being provided brought into action by the operation of said switch blade of the first-acting relay for building up the voltage on the grid of said tube at a predetermined rate.

21. In a commercial freezer, a normally open electric circuit, means for dispensing frozen mix at a constant rate during the time said circuit remains closed, two 2-position switches, electric means acting when one of said switches occupies one of its two positions to cause said circuit to be closed for a period of predetermined duration and when the other of said switches occupies one of its two positions to cause said circuit to be closed for a period having a predetermined different duration, and electric means acting when both of said switches occupy said recited circuit-closing position to close said circuit for a period of time coinciding with the period during which both switches are so closed.

References Cited in the file of this patent

UNITED STATES PATENTS

| | | |
|---|---|---|
| 595,898 | Whipple | Dec. 21, 1897 |
| 1,645,782 | Tyson | Oct. 18, 1927 |
| 2,231,689 | Shaw | Feb. 11, 1941 |
| 2,508,435 | Tacchella | May 23, 1950 |
| 2,559,032 | Tacchella | July 3, 1951 |
| 2,674,669 | Leedam | Apr. 6, 1954 |
| 2,683,197 | Brown | July 6, 1954 |
| 2,687,019 | Swenson | Aug. 24, 1954 |
| 2,767,553 | Lewis | Oct. 23, 1956 |

FOREIGN PATENTS

| | | |
|---|---|---|
| 503,150 | Belgium | May 31, 1951 |
| 888,862 | Germany | Sept. 7, 1953 |